(No Model.)
W. J. & J. ROBERTSON.
HITCHING WEIGHT DEVICE AND SUPPORT.
No. 466,837. Patented Jan. 12, 1892.
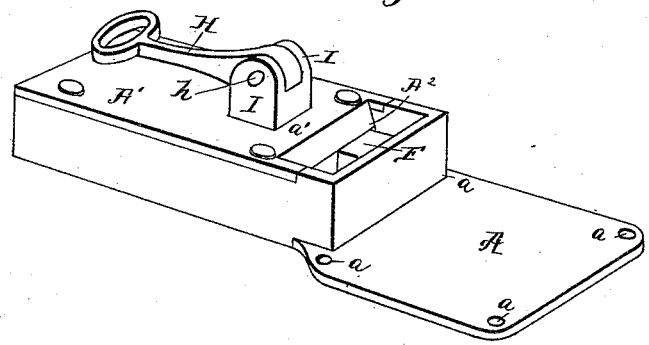
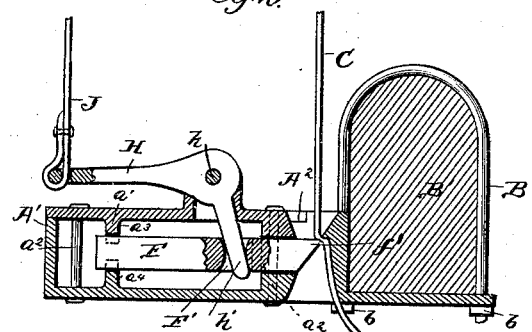
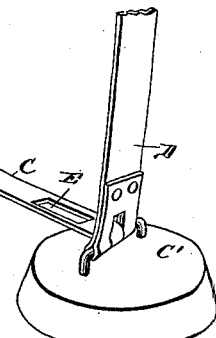
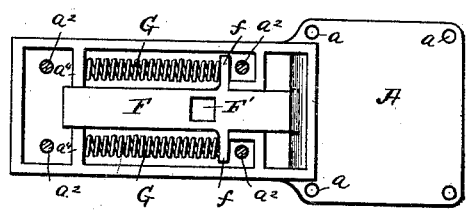
Witnesses.
Wm. M. Rheem.
A. M. Bennett.
Inventors:
William J. Robertson,
and Jackson Robertson,
By Charles J. Brown, Atty.

UNITED STATES PATENT OFFICE.

WILLIAM J. ROBERTSON AND JACKSON ROBERTSON, OF CHICAGO, ILLINOIS.

HITCHING-WEIGHT DEVICE AND SUPPORT.

SPECIFICATION forming part of Letters Patent No. 466,837, dated January 12, 1892.

Application filed November 19, 1890. Serial No. 371,918. (No model.)

*To all whom it may concern:*

Be it known that we, WILLIAM J. ROBERTSON and JACKSON ROBERTSON, subjects of the Queen of Great Britain and Ireland, and residents of the city of Chicago, in the county of Cook and State of Illinois, have invented certain new and useful Improvements in a Hitching-Weight Device and Support, of which the following, in connection with the drawings accompanying and forming a part hereof, is a full and complete specification.

The object of our invention is to obtain a device which may be secured to the axle of a vehicle and have suspended therefrom and supported thereby a hitching-weight in such manner that the hitching-weight can be released from the device and dropped to the ground when desired, and at pleasure again raised from the ground and be held by the device in a suspended position close to the device and to the axle of the vehicle to which the device is secured. A strap extends in the ordinary manner from the weight to the head or neck of the animal hitched up to the vehicle.

We have illustrated our invention by the drawings accompanying and forming a part of this specification, in which—

Figure 1 is a perspective of the device; Fig. 2, a longitudinal section of the device and a cross-section of the axle of a vehicle to which it is secured. Fig. 3 is a plan view of the device with the plate forming the cover of the case thereof removed, so as to show the movable parts of the device.

Like letters refer to like parts throughout the several views.

A is a web adapted to extend underneath the axle of a vehicle and having holes $a\ a$ therein, through which holes a staple B can be passed.

A' is a case, within which are contained the movable parts of the device. Case A' is rigidly secured to web A and may be made integral therewith when constructed of cast metal.

$a'$ is a plate forming a cover of the case A', and is secured to the case A' by bolts $a^2$ $a^2$, which may be riveted in the ordinary manner.

$a^3\ a^3$ are lugs on plate $a'$, and $a^4$ is a partition in case A', extending across the case and a portion of the way up from the bottom thereof. This partition $a^4$ forms the guide for the latch-bolt, hereinafter described, and the abutments for springs, also named herein.

$A^2$ is a hole extending through the case A'.

B B are staples, and B' is the axle of a vehicle. The staples B extend around the axle B' through the holes $a\ a$ in web A and are secured in position by nuts $b\ b$.

C is a strap passing through hole $A^2$ of casing A'. To the lower end of this strap C is secured a hitching-weight C'. The upper end of the strap C extends into the vehicle either through a hole in the floor thereof or over the sides of the body of the vehicle.

D is a strap extending from the weight C' to the head or neck of the animal hitched up in the vehicle to which the device is attached.

E is a slot in strap C.

F is a latch-bolt moving longitudinally in casing A' and partition $a^4$.

$f\ f$ are lugs or projections on latch-bolt F.

G G are spiral springs holding latch-bolt F yieldingly in the position illustrated in Figs. 1, 2, and 3. One end of the springs G G abuts at one end against lugs or projections $f\ f$ and at the other end against the partition $a^4$.

H is a bell-crank or right-angled lever pivoted on pivot $h$ in the ears I on the upper face of the cover $a'$ of casing A'.

J is a strap extending from lever H to within reach of the person or persons in the vehicle. By inspection of Fig. 2 it will be readily seen that when the strap J is pulled upward lever H is turned upon its pivot $h$, the arm $h'$ thereof is moved to the left, and the latch-bolt F is thereby retracted from the hole E in strap C. The weight will then drop to the ground. When the strap C is pulled upward, the inclined face $f'$ of the bolt F allows such upward movement of the strap without retraction of the bolt by pulling the strap J, and when the strap C is pulled so far upward that the hole E is opposite the end of the bolt F such bolt F will be forced by springs G automatically into such hole E and the weight C' will be held suspended thereby.

It will be observed that the device is so arranged that no mud, liquid, or other substance can readily obtain entrance thereinto to interfere with the proper working of the movable parts thereof when such mud, liquid, or other substance is thrown against the device by the action of the wheels of the vehicle or of the foot of the animal hitched up thereto.

The arm $h'$ of the pivot-lever H passes through hole F' in the bolt F, fitting loosely in this hole, the movement of the lower end of the lever being thereby communicated to the latch-bolt F.

The device can be secured to the bottom of the vehicle-body when a hole is made in such bottom so that the strap C can pass through it, and in such case the weight C' is thrown upward against the bottom of the vehicle by strap C when such weight is not in use as a hitching-weight.

Having thus described our invention, what we claim and desire to secure by Letters Patent of the United States, is—

1. In a hitching-weight device and support, a casing, a hole extending through the casing, through which hole a strap can be passed and moved longitudinally, a bolt longitudinally movable in the casing and yieldingly held by springs abutting against projections on the bolt and against the casing across the hole, and a lever, one end of which engages with the movable bolt and the other end adapted to have a strap secured thereto by which such lever can be actuated and the bolt retracted from the hole, in combination with a strap passing through the hole in the casing, such strap having a hole therein in which the bolt is yieldingly held, substantially as described.

2. In a hitching-weight device and support, the combination of a casing having a hole at one end thereof, through which a strap can be passed fitting loosely therein, a longitudinally-movable bolt yieldingly held across the hole in the casing, projections on the movable bolt, a spring in the casing, one end of the spring abutting against the projections on the movable bolt and the other end against a partition in the casing, a hole in the movable bolt, a pivotal lever extending through the hole in the movable bolt and through the casing, and straps, one of which is secured to the pivotal lever and the other of which passes through the hole in the casing, such last-named strap having a weight attached to one end thereof and having a hole therein in which the movable bolt is yieldingly held by the spring, substantially as described.

3. In a hitching-weight device, a casing consisting of a top, a bottom, two side walls, and two end walls, the side walls of the casing extending beyond the top and bottom walls and beyond the end wall at one end of the casing, a wall connecting the extended side walls, a bolt longitudinally movable in the casing and yieldingly held by a spring abutting against projections on the bolt and against the casing, so as to extend through the end wall of the casing at the end thereof, having the extended sides, and against the wall connecting such extended sides, such bolt thereby extending across the passage-way formed by the extended sides and connecting end wall, and a pivoted lever, one end of which engages with the longitudinally-movable bolt and the other end adapted to have a strap secured thereto by which it can be actuated and the longitudinally-movable bolt retracted, in combination with a strap passing through the passage-way, such strap having a hole therein into which hole the bolt can pass when opposite thereof, substantially as described.

WILLIAM J. ROBERTSON.
JACKSON ROBERTSON.

Witnesses:
FLORA L. BROWN,
CHARLES T. BROWN.